May 13, 1947.　　A. L. DONAHEW ET AL　　2,420,305
HYDRAULIC TRANSMISSION AND CLUTCH
Filed Sept. 21, 1943　　2 Sheets-Sheet 1
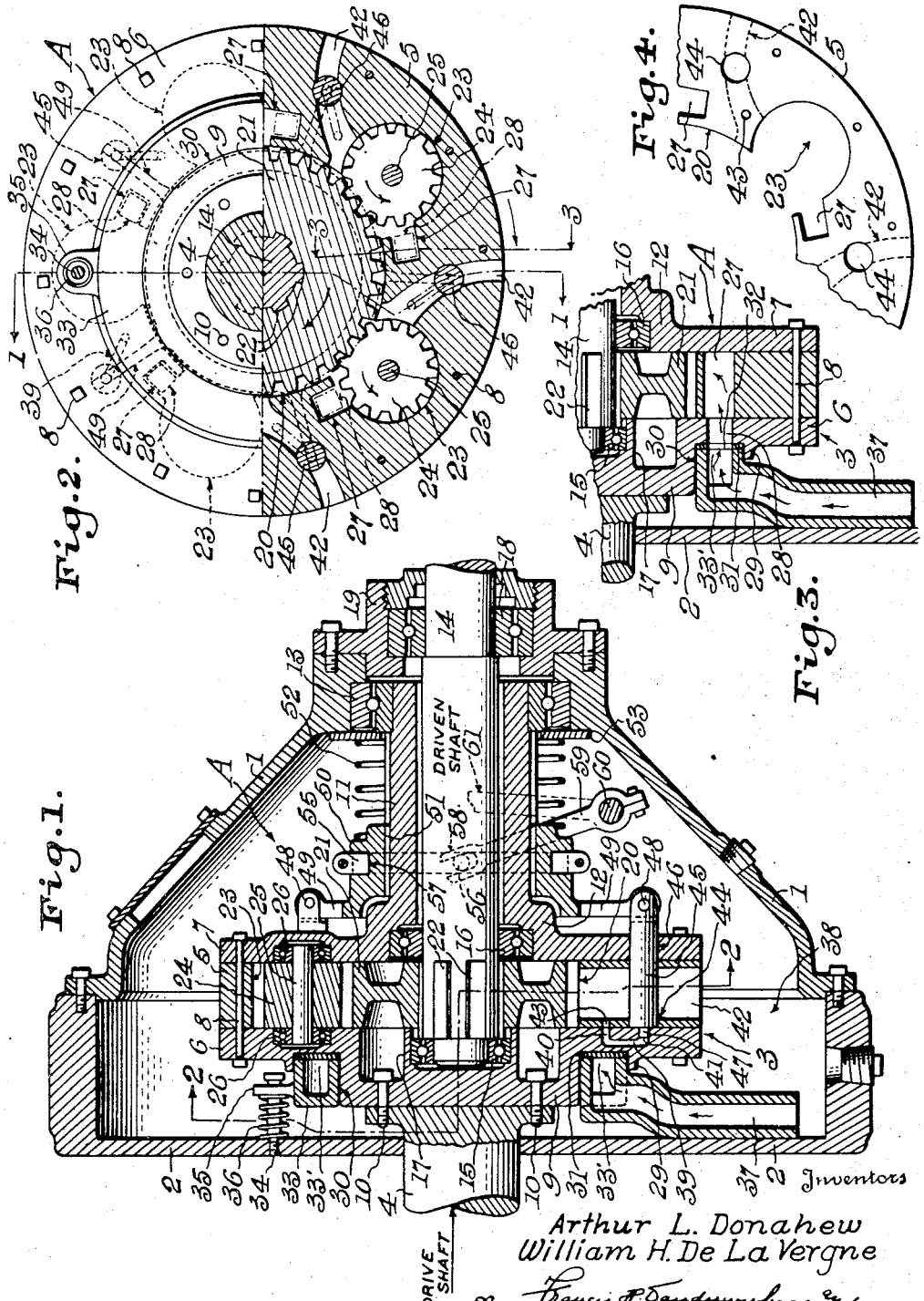
Inventors
Arthur L. Donahew
William H. De La Vergne

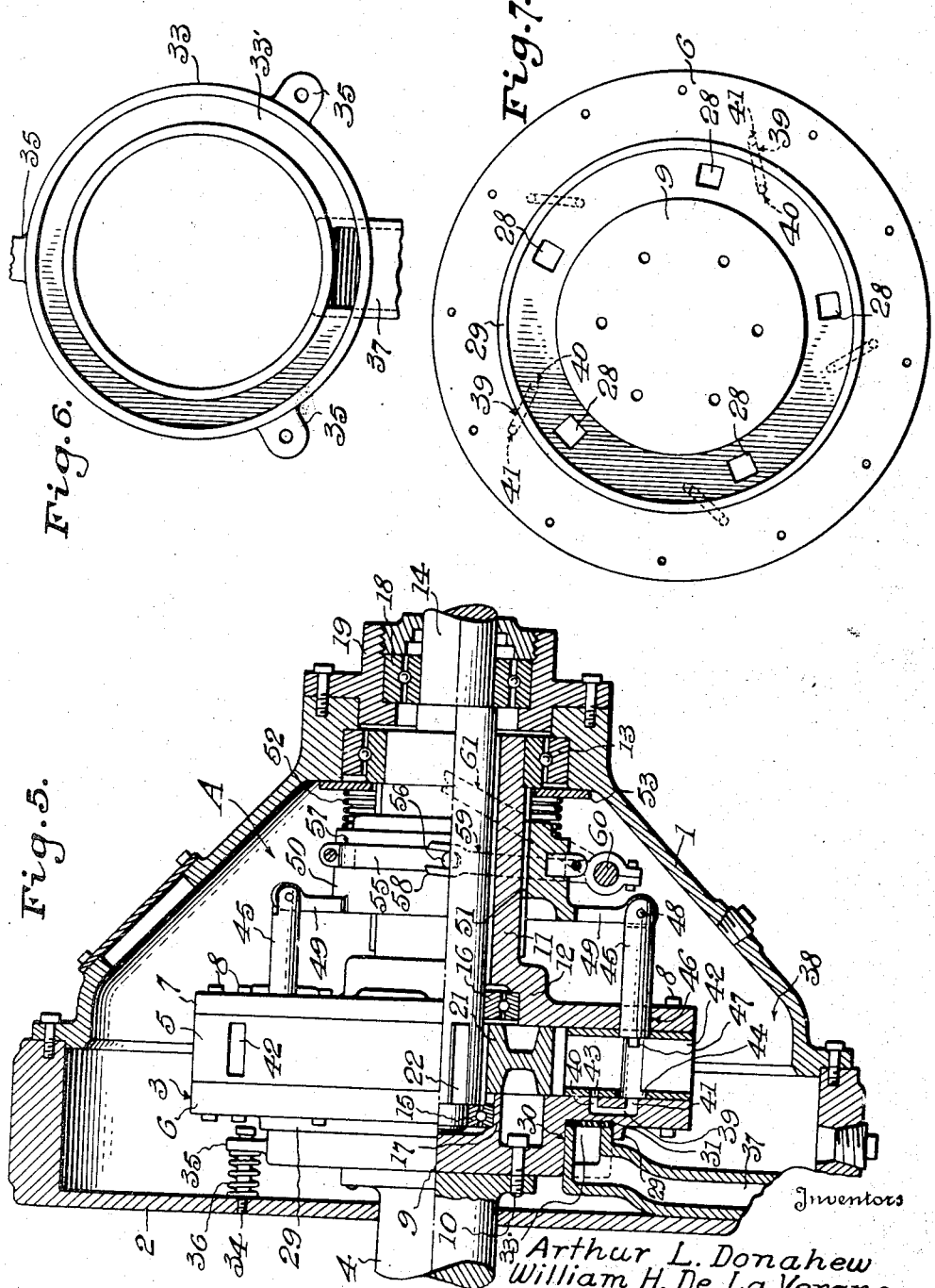

Patented May 13, 1947

2,420,305

UNITED STATES PATENT OFFICE 2,420,305

HYDRAULIC TRANSMISSION AND CLUTCH

Arthur L. Donahew, United States Army, and William H. De La Vergne, Washington, D. C.

Application September 21, 1943, Serial No. 503,310

4 Claims. (Cl. 192—61)

(Granted under the act of March 3, 1883, as amended April 30, 1928; 370 O. G. 757)

The invention described herein may be manufactured and used by or for the Government for governmental purposes, without payment of any royalty thereon.

This invention relates to a hydraulic power transmission and clutch applicable to practically any type of equipment in which a variable speed drive is required such as automotive vehicles.

One of the objects of the invention is to provide a variable hydraulic transmission and clutch wherein power is transmitted from a driving member of a power unit to a driven member through the medium of a gear mechanism including means adapted to generate pressures on a fluid to substantially any amount for increasing the power transmitted from the driving member to the driven member, and means for controlling the pressures generated by the first-mentioned means on the fluid in accordance with the varying conditions of load and speed.

Another object of the invention is to provide a variable fluid transmission and clutch in which power is transmitted from a driving shaft of a power unit to a driven shaft at variable speed ratios through a pump adapted to generate variable pressures on a fluid medium and in which the variable generated pressures may be manually controlled whereby an operator of the power unit is enabled to rapidly control the application of power from the driving shaft to the driven shaft and to secure transmission conditions of a free power unit, positive hydraulic speed reduction, direct coupling drive and permits slippage within the entire rage of the rotative speeds regardless of the speeds of the power unit.

Briefly stated, the instant invention is applicable to any prime mover wherein power is required to be transmitted at variable speeds from a driving member to a driven member and is directed to a driving rotor in the form of a gear housing containing a hydraulic gear pump of the epicyclic type in which rotary motion of the prime mover is transmitted from a plurality of planet gears mounted on the gear housing to a sun gear mounted on the driven member. A transmission fluid which is contained within an outer casing is caused to enter the gear housing through a plurality of intake ports and to be pumped by the planet gears through outlet passages having valves movably mounted therein. Upon operation of the valves, the outlet passages which lead into the outer casing may be opened to permit the transmission fluid to pass freely through the outlet passages and empty into the outer casing whereby the planet gears rotate around the sun gear but do not transmit any rotary motion thereto, thus causing the driven member to remain stationary. Should the valves be operated to completely close the outlet passages, the transmission fluid is trapped in the gear housing and the planet gears generate such a pressure on the fluid that they are brought to a standstill and locked in mesh with the sun gear, thereby providing a direct coupling between the driving member and driven member. If the valves are operated intermediate their completely closed or opened positions, the sun gear is driven to a certain extent by the planet gears with slippage relative to the planet gears. In case the valves are completely closed and the planet gears have generated more pressure on the transmission fluid than is necessary to carry a predetermined load, the valves are acted upon by the excess fluid pressure against the action of a spring to release the pressure of the fluid on the valves, thereby preventing any harmful excess load being applied to the prime mover.

The improved hydraulic transmission is particularly adapted to be employed in vehicles such as motor cars and the like, in which an internal combustion engine is used as a source of motive power and by the employment of the instant invention the conventional gear and clutch mechanism and also the means for manually controlling the gear and clutch mechanism generally used now in motor car transmission mechanism is dispensed with. The only control necessary in using the present device is a single manual control such as a foot pedal or the like adapted to actuate the plurality of valves for controlling the pressures of the transmission fluid generated by the epicyclic type gear pump.

Various types of transmissions of the present type have been employed in an effort to produce control of the gear pump discharge pressures of the transmission fluid, but the instant transmission differs particularly from known devices of this type in that the control of the discharge of the transmission fluid is accomplished by the manipulation of a plurality of valves located on the transmission and upon the valves being opened the transmission fluid is discharged from the unit to an external reservoir, with the fluid discharge taking place through radially extending outlet passages, with overload protection being accomplished by applying generated fluid pressures to the front end of the valves against the action of a spring, whereby a positive and simple method of overload protection is provided.

With the above and other objects and advantages in view, the invention consists of certain features of construction and operation of parts which will hereinafter be described and shown in the accompanying drawings, in which:

Fig. 1 is a fragmentary vertical axial sectional view through the hydraulic transmission and clutch taken on line 1—1 of Fig. 2, showing valves used in carrying out the invention in a closed position;

Fig. 2 is a cross-sectional view thereof taken on line 2—2 of Fig. 1;

Fig. 3 is a fragmentary transverse cross-sectional view taken on the line 3—3 of Fig. 2;

Fig. 4 is a fragmentary detail view of a portion of a gear housing;

Fig. 5 is a fragmentary vertical axial sectional view partly in elevation of the hydraulic transmission and clutch showing the valves in an open position.

Fig. 6 is a detail plan view of one side of an annular channel member having a fragmentary portion of a fluid intake conduit mounted thereon used in carrying out the invention; and Fig. 7 is a detail side elevation of a plate used on the gear housing.

Referring more specifically to the drawings, the improved hydraulic transmission and clutch indicated generally by A is rotatably mounted within an outer casing or reservoir 1 closed at one end by a wall 2 and comprises a gear housing 3 connected to a prime mover (not shown) through a driving shaft 4, which in the case of the usual automobile would be the crankshaft of the engine.

The gear housing 3 is formed of a central body 5 and side plates 6 and 7 joined together by bolts 8. The side plate 6 is provided with a hub 9 formed integral with and extending outwardly therefrom, said hub 9 being fixedly connected to the inner end of the driving shaft 4 by bolts 10. The side plate 7 is provided with a sleeve 11 and a hollow hub 12 which extend outwardly therefrom in an opposite direction from the hub 9 on the side plate 6. The sleeve 11 is rotatably mounted at its outer end in a bearing 13 and surrounds a driven shaft 14 which is in alinement with the driving shaft 4. The driven shaft 14 is rotatably mounted at its inner end in bearings 15 and 16, with the bearing 15 being carried by a boss 17 formed on the inner surface of the side plate 6 and the bearing 16 being fitted into the hollow hub 12 of the side plate 7. The outer end of the driven shaft 14 is mounted in a bearing 18 carried by a collar 19 mounted on the casing 1.

The central body 5 of the gear housing 3 has a main chamber 20 formed centrally therein which fits snugly around a sun gear 21 fixedly mounted on the inner end of the driven shaft 14 by splines 22 and auxiliary chambers 23 are formed in the body 5, said auxiliary chambers 23 communicating with the main chamber 20 as illustrated in Fig. 2 and having planet gears 24 snugly fitted therein. The planet gears 24 mesh with the sun gear 21 and are fixedly mounted on shafts 25 rotatably mounted in bearings 26 carried by the side plates 6 and 7. The body is also provided with channels 27 and the side plate 6 is provided with intake ports 28, with one of each of the channels 27 communicating with one of each of the auxiliary chambers 23 and with one of each of the intake ports 28. The intake ports 28 extend through the side plate 6 and are surrounded by a circular flange 29 formed on the outer surface of the side plate 6.

The flange 29 and the outer periphery of the hub 9 of the side plate 6 form an annular channel 30 having a washer 31 mounted therein, which washer 31 is provided with apertures 32 registering with the intake ports 28, Fig. 3. An annular channel member 33 is non-rotatably supported on the hub 9 by means of studs 34 mounted on the end wall 2 of casing 1, with the annular open end 33' of the channel member 33 extending into the channel 30 and abutting against the outer edges of the washer 31. The studs 34 extend through ears 35 suitably spaced around the channel member 33 and have expansion springs 36 mounted thereon, which springs 36 abut at one of their ends against the end wall 2 of the casing 1 and abut at their other ends against the ears 35 for holding the channel member 33 in the channel 30. An intake conduit 37 is provided which extends downwardly from the channel member 33 into a sump 38 formed in the casing 1.

The side plate 6 has a plurality of substantially U-shaped by-passes 39 formed therein, which extend inwardly at one of their ends 40 from the inner surface of the side plate 6, thence outwardly toward the periphery of the gear housing 3 and then inwardly at their other ends 41 through the inner surface of the side plate 6. Exhaust or outlet passages 42 are formed in the central body 5 of the gear housing 3, with one of each of the exhaust passages 42 extending outwardly in a curved manner through the periphery of the gear housing body 5 from one of each of the auxiliary chambers 23 and from the main chamber 20, with the outer ends of the exhaust passages 42 being equally spaced around the driving rotor 3.

The inner ends 40 of the by-passes 39 are connected in communication with the exhaust passages 42 through apertures 43 formed in the body 5 of the driving rotor and the ends 41 of the by-passes 39 are connected in communication with the exhaust passages 42 through transversely extending valve openings 44 also formed in the gear housing body 5. The valve openings 44 have valves 45 movably mounted therein, which valves 45 are made in the form of plugs or pistons extending through holes 46 equally spaced from the center of the gear housing 3. The inner ends of the valves 45 are reduced in diameter forming plug portions 47 adapted to engage within the ends 41 of the by-passes 39 and the outer ends of the valves 45 are connected by pins 48 to the outer ends of arms 49 extending outwardly from a collar 50 slidably mounted on and rotatable with the sleeve 11 by means of splines 51. The collar 50 is engaged by one end of an expansion spring 52, with the other end of the spring 52 engaging a washer 53 abutting against the inner surface of the casing 1 whereby the collar 50 is normally held by the spring 52 for holding the valves 45 in a closed position as illustrated in Fig. 1. A clamping ring 55 made of semi-circular sections having pins 56 thereon is mounted in an annular groove 57 formed in the collar 50. The pins 56 on the semi-circular sections of the ring 55 are engaged by the forked ends 58 of a yoke 59 mounted on a rock shaft 60 which may be actuated by any suitable means such as a lever 61.

In operation, assuming that a suitable fluid such as oil has been provided in the casing or reservoir 1, the fluid will enter the annular channel member 33 through intake conduit 37 and pass into the gear housing 3 through the intake ports 28 in side plate 6. With the driving shaft 4 and housing 3 rotated in the direction as indicated by the arrows, the planet gears 24 rotating in mesh around the sun gear 21 will pump the fluid into the exhaust passages 42 and, should the valves 45 be actuated to an open position as illustrated in Fig. 5, the fluid will pass through the exhaust passages 42 and be returned to the casing 1 whereby the planet gears 24 will be rotated around the sun gear 21 without producing any torque thereon in driving the driven shaft 14. The valves 45 are actuated to an open position by actuating the lever 61 which in turn rotates the rock shaft 60, thus moving the yoke 59 to cause the forked ends 58 thereof to slide the collar 50 outwardly on the sleeve 11 against the action of the expansion spring 52. Upon the collar 50 being moved outwardly, the valves 45 connected thereto will be pulled outwardly from engagement with the valve openings 44, thereby permitting free movement of the operating fluid through the exhaust passages 42. The valves 45 being actuated to partially close the exhaust passages 42, the planet gears 24 will produce a certain pressure on the operating fluid due to the restricted flow of the operating fluid through the exhaust passages 42 whereby the planet gears are caused to rotate at a reduced speed around the sun gear. This reduced speed causes the planet gears 24 to impart a certain torque to the sun gear 21 for driving the driven shaft 14, but at the same time permitting slippage of the planet gears. Should the valves 45 be actuated to completely close the exhaust passages 42, with the plug portions 47 on the inner ends of the valves engaging in the ends 41 of the by-passes 39, the planet gears 24 will be operated until they cannot generate any more pressure on the operating fluid whereby they will be brought to a stop and locked in mesh with the sun gear 21, thus providing a direct drive from the driving shaft 4 to the driven shaft 14. In case the pressure of the operating fluid becomes excessive, the pressure of the fluid in the by-passes 39 acts against the plug portions 47 of the valves 45 with a sufficient pressure to force the valves outwardly from engagement with the ends 41 of the by-passes 39 whereby the operating fluid may pass through the by-passes 39 and the exhaust passages 42 to release the pressure of the operating fluid.

The rotary gear pump of the epicyclic type used to transmit torque from the driving shaft to the driven shaft contains the inherent characteristics of driving the driven shaft through an oil cushion, thus preventing transmittal of any destructive forces and performs transmittal of rotation and power without mechanical friction.

It will thus be seen that there is provided an efficient form of hydraulic transmission and clutch which is well adapted for the purpose indicated. Even though there has been herein shown and described certain features of construction and operation of parts, it is nevertheless to be understood that various changes may be made therein, if the changes do not depart from the spirit or scope of the claims.

Having thus described our invention, what we claim as new and wish to secure by Letters Patent is:

1. A hydraulic transmission and clutch comprising a casing adapted to contain a fluid, a driving member and a driven member in axial alinement mounted on said casing, a gear housing fixedly mounted on said driving member and having intake ports and outlet passages formed therein, said intake ports adapted to admit fluid from the casing into said housing, by-passes formed in said housing and communicating with said outlet passages, an epicyclic gear pump rotatably connecting said housing to said driven member, said pump comprising a sun gear fixedly mounted on said driven member and planet gears rotatably mounted in spaced relation on said housing, said planet gears meshing with said sun gear and adapted to pump fluid under pressure from said housing through said outlet passages, a manually operated valve control means including a spring and having valves including plug ends connected thereto, said valves extending into said housing and intercepting said outlet passages for controlling the opening and closing thereof and said by-passes upon the actuation of said control means, said control means adapted to actuate said valves to a complete opening, closing or intermediate position for controlling the amount of pressure generated on the fluid, whereby the planet gears may rotate freely on said sun gear for permitting the driven member to be idle or to effect rotation of the sun gear for driving the driven member at a speed in accordance with load conditions, said plug ends of said valves adapted to engage said by-passes upon the valves being actuated to a completely closed position and to be acted upon by the fluid pressure through said by-passes to actuate said valves against the action of said spring for releasing the fluid pressure upon the planet gears generating a pressure above a predetermined amount.

2. A hydraulic transmission and clutch, comprising a casing adapted to contain a fluid, a driving member and a driven member in axial alignment mounted on said casing, a gear housing fixedly mounted on said driving member and having intake ports and discharge passages formed therein, said intake ports adapted to admit fluid from said casing into said housing, a sleeve provided on said housing and rotatably mounted on said driven member, by-passes formed in said housing and communicating with said discharge passages, an epicyclic gear pump rotatably connecting said housing to said driven member, said pump comprising a sun gear fixedly mounted on said driven member, and planet gears rotatably mounted on said housing, said planet gears meshing with said sun gear and adapted to pump fluid under pressure from the gear housing through said discharge passages, manually operated valve control means including a collar slidably mounted on and adapted to rotate with said sleeve, valves including plug ends connected to said collar, said valves extending into said housing and intercepting said discharge passages for controlling the opening and closing thereof and said valve control means adapted to actuate said valves to a complete opening, closing or intermediate position for controlling the amount of pressure generated on the fluid, whereby the planet gears may rotate freely on said sun gear for permitting the driven member to be idle or to effect rotation of the sun gear for driving the driven member at a speed in accordance with load conditions, said plug ends of said valves engaging said by-passes upon the valves being actuated to completely closed position and to be acted upon by the fluid pressure through said by-passes to actuate said valves for releasing the fluid pressure upon the planet gears generating a pressure above a predetermined amount.

3. A hydraulic transmission and clutch comprising a casing adapted to contain a fluid, a driving member and a driven member in axial alignment mounted on said casing, a gear housing fixedly mounted on said driving member, said gear housing having intake ports formed therein and including a central body having channels, outlet passages, a main chamber and auxiliary chambers formed therein, said auxiliary chambers communicating with said main chamber, one of each of said channels communicating with one of each of said auxiliary chambers and with one of each of said intake ports, an epicyclic gear pump rotatably connecting said housing to said driven member, said pump comprising a sun gear rotatably arranged within said main chamber and fixedly mounted on the inner end of said driven member, and planet gears rotatably mounted in said auxiliary chambers, said planet gears meshing with said sun gear and adapted to pump fluid under pressure through said outlet passages, manually operated valve control means including a spring and having valves provided with plug ends connected thereto, said valves extending into said housing and intercepting said outlet passages for controlling the opening and closing thereof and said valve control means adapted to actuate said valves to a complete opening, closing or intermediate position for controlling the amount of pressure generated on the fluid, whereby the planet gears may rotate freely on said sun gear for permitting the driven member to be idle or to effect rotation of the sun gear for driving the driven member at a speed in accordance with load conditions, said plug ends of said valves adapted to engage said by-passes upon the valves being actuated to completely closed position and to be acted upon by the fluid pressure through said by-passes to actuate said valves against the action of said springs for releasing the fluid pressure upon the planet gears generating a pressure above a predetermined amount.

4. A hydraulic transmission and clutch comprising a casing adapted to contain a fluid, a driving member and a driven member in axial alignment mounted on said casing, a gear housing fixedly mounted on said driving member, said gear housing including a central body and side plates, one of said side plates containing intake ports and having a hub mounted on said driving member and another of said side plates having a sleeve rotatably mounted on said driven member, outlet passages formed in said central body and by-passes formed in said first-mentioned side plate, said by-passes communicating with said outlet passages, an epicyclic gear pump rotatably mounted on said central body and connecting said housing to said driven member, said pump comprising a sun gear fixedly mounted on said driven member and planet gears rotatably mounted in spaced relation on said central body, said planet gears meshing with said sun gear and adapted to pump fluid under pressure from said housing through said outlet passages, a manually operated valve control means having valves including plug ends connected thereto, said valves extending into said housing and intercepting said outlet passages for controlling the opening and closing thereof upon the actuation of said control means, said control means adapted to actuate said valves to a complete opening, closing or intermediate position for controlling the amount of pressure generated on the fluid, whereby the planet gears may rotate freely on said sun gear for permitting the driven member to be idle or to effect rotation of the sun gear for driving the driven member at a speed in accordance with load conditions, said plug ends of said valves engaging said by-passes upon the valves being actuated to completely closed position and to be acted upon by the fluid pressure through said by-passes to actuate said valves for releasing the fluid pressure upon the planet gears generating a pressure above a predetermined amount.

ARTHUR L. DONAHEW.
WILLIAM H. DE LA VERGNE.

REFERENCES CITED

The following references are of record in the file of this patent:

UNITED STATES PATENTS

| Number | Name | Date |
|---|---|---|
| 881,472 | Hollister | Mar. 10, 1908 |
| 2,311,237 | Loveday | Feb. 16, 1943 |
| 1,450,679 | Grafenstah | Apr. 3, 1923 |
| 1,561,549 | Kraft | Nov. 17, 1925 |
| 2,066,450 | Bascle | Jan. 5, 1937 |

FOREIGN PATENTS

| Number | Country | Date |
|---|---|---|
| 407,939 | Great Britain | Mar. 26, 1934 |
| 408,584 | Great Britain | Apr. 10, 1934 |
| 417,017 | Great Britain | Sept. 26, 1934 |
| 386,870 | Great Britain | Jan. 26, 1933 |